United States Patent [19]

Glaize et al.

[11] Patent Number: 4,870,358

[45] Date of Patent: Sep. 26, 1989

[54] ANGULAR POSITION SENSOR AND ANGULAR POSITION DETERMINATION MEANS EQUIPPED WITH SEVERAL OF THESE SENSORS

[75] Inventors: Christian Glaize, Castelnau Le Lez; Guy Lemarquand, Pringy, both of France

[73] Assignee: Commissariat a l'Energie Atomique, Paris, France

[21] Appl. No.: 66,458

[22] Filed: Jun. 26, 1987

[30] Foreign Application Priority Data

Jul. 2, 1986 [FR] France .................................. 86 09613

[51] Int. Cl.4 ...................... G01B 7/30; G08C 19/06; B25J 19/02
[52] U.S. Cl. .................................. 324/208; 310/168; 318/653; 340/870.31; 901/46
[58] Field of Search .................................. 324/163–166, 324/173, 174, 207, 208; 310/155, 168; 318/715, 721, 653, 654; 340/672, 870.31, 870.32, 870.33, 870.34; 901/46; 341/15

[56] References Cited

U.S. PATENT DOCUMENTS

| | | |
|---|---|---|
| 1,744,609 | 1/1930 | Bethenod et al. |
| 1,929,259 | 10/1933 | Rich .................................. 324/163 X |
| 2,340,609 | 2/1944 | Mestas .................................. 324/208 |
| 3,001,127 | 9/1961 | Pitches et al. .................................. 340/870.31 |
| 3,024,409 | 3/1962 | Brown et al. .................................. 340/870.32 |
| 3,206,738 | 9/1965 | Wayman .................................. 341/15 X |
| 3,278,928 | 10/1966 | Loughlin et al. .................................. 341/15 X |
| 3,317,765 | 5/1967 | Cone . |
| 3,448,363 | 6/1969 | Pierro et al. .................................. 318/721 X |
| 3,466,477 | 9/1969 | Newill .................................. 324/173 X |
| 4,159,433 | 6/1979 | Takayama et al. .................................. 310/168 |
| 4,406,983 | 9/1983 | Ramirez .................................. 324/174 X |
| 4,450,396 | 5/1984 | Thornton .................................. 318/721 |
| 4,604,575 | 8/1986 | Shimizu et al. .................................. 324/208 X |
| 4,764,767 | 8/1988 | Ichikawa et al. .................................. 340/870.31 |

FOREIGN PATENT DOCUMENTS

| | | |
|---|---|---|
| 0082943 | 7/1983 | European Pat. Off. . |
| 2517487 | 6/1983 | France . |
| 0549870 | 11/1947 | United Kingdom . |

Primary Examiner—Gerard R. Strecker
Attorney, Agent, or Firm—James E. Nilles; Thomas F. Kirby

[57] ABSTRACT

An angular position sensor for determining the relative angular position of two relatively rotatable ferromagnetic coaxial components, such as a rotor and stator. The components have the same number of regularly distributed teeth and the teeth in one component are separated by an air gap from the teeth in the other component. A plurality of coils are connected in series with each other and are disposed around the teeth in one of the components and correspond in number to the number of associated teeth. An electric excitation signal having a measurable constant electrical characteristic is fed to the plurality of coils from a source. The characteristic is modulatable in response to variations in the magnetic reluctance of the air gap effected by changes in the relative angular position between the two components. Electronic circuitry is connected to coils for measuring the modulation of the characteristics to determine the relative angular position of the components. In angular position determination apparatus comprising a plurality of angular position sensors, mechanical connections are provided between the rotors on the one hand and the stators on the other. The angular displacement between the rotor and stator teeth differs for each sensor, the difference generally being a multiple of the quotient of $2\pi$ by the number of teeth and the number of sensors. The sensor is well adapted for use in the robotics field.

12 Claims, 5 Drawing Sheets

ANGULAR POSITION SENSOR AND ANGULAR POSITION DETERMINATION MEANS EQUIPPED WITH SEVERAL OF THESE SENSORS

BACKGROUND OF THE INVENTION

The present invention relates to an angular position sensor or transducer located between two coaxial parts, which are either stationary or in relative rotation and having a magnetic reluctance which varies as a function of said angular position. It also relates to an angular position determination means equipped with several of these sensors or transducers.

There is a particular need for very accurate angular position measuring equipment in robotics, where it is necessary to accurately determine the working angle of the joints of the arms of robots. The checking of the very fine angular displacements can be carried out as a result of a series of devices which, coupled to one another or extended by angle multipliers (particularly gears) make it possible to discretize the circular movements in a very precise manner.

The process based on magnetic reluctance variation consists of passing an alternating electric signal into a coil surrounding a ferromagnetic structure. Thus, a magnetic flux is produced, which flows in a magnetic circuit formed from two almost contiguous parts which effect a relative displacement. The alternating signal passed into the electric circuit is closely dependent on said magnetic flux and can consequently characterise the same. As a function of their characteristics, the sensors make it possible to obtain the relative position of the two parts forming the magnetic circuit.

The equipment exploiting this phenomenon and applying it to the determination of the angular position comprise a rotor and a stator having teeth separated by an air gap. The notion of stator and rotor is not very significant for this application of angular position sensors, because these two concepts can also designate the inductor and the armature, the internal part as well as the external part, or even two parts arranged in parallel on either side of a planer air gap. This remark also applies to the present invention.

The hitherto developed angular position sensors able to supply very accurate measurements are of two types, examples of which are shown in FIGS. 1 and 2. According to the first of these examples, the part not carrying coils is provided with M patterns (studs or teeth) regularly distributed over its circumference, whereas the inducting part carries n×M smaller patterns, whereof each group of n patterns is surrounded by a coil supplied by an alternating current, whose phase differs by $2\pi/n$ from that supplying adjacent coils, with the exception of the two-phase coil for which 4M patterns are necessary.

Thus, the sensor comprises repeat patterns displaced by $2\pi/M$ radians. The electric angle is said to be equal to the mechanical angle multiplied by M. If M is large, the measurements are in principle more precise, but there are soon limitations due to uncertainties concerning the machining of parts, particularly if polyphase currents are supplied which require more numerous patterns on the part equipped with the coils.

A second type of sensor or transducer shown in FIG. 2 and taken from the article "A New High Accuracy Angular Position Transducer", PCIM, September 1985, p. 55 by I. B. Cushing shows M racks on the rotor or stator, each equipped with an almost equal number of teeth. The coils, which in this case are located on the stator, are supplied by polyphase alternating currents. The major feature of this sensor is that the racks of one of the parts are not regularly spaced, so that the teeth of the racks carrying the coils of the same phase are always arranged in a similar manner facing the teeth of the other part. Moreover, a rotation of the rotor which brings a rack of the stator in front of the teeth of the rotor, in the same way as another rack of the stator into the starting position, corresponds to an electric angle of alpha alpha, being the phase displacement between the currents supplying the coils of these two stator racks.

Thus, the principle is the same as in the previous case and hereagain manufacturing tolerances impose practical limitations to the number of patterns which can be used.

The present invention makes it possible to obviate this limitation by means of an angular position sensor of simple manufacture and constituted more particularly by a rotor and a stator having the same number of regularly spaced teeth. According to a preferred embodiment of the invention, several of these sensors are associated in parallel and form an angular position determination means making it possible to obtain a finer angular step.

SUMMARY OF THE INVENTION

The present invention more specifically relates to an angular position sensor, wherein it comprises a ferromagnetic rotor and stator separated by an air gap and having the same number of regularly distributed teeth, a single phase coil arranged around all the teeth of the rotor or stator making it possible to measure the magnetic reluctance of the air gap and an electronic system for measuring the modulation of the electric signal passing through said coil, the stator and rotor being stationary.

It also relates to a means for determining the angular position of two coaxial parts wherein it comprises a plurality of sensors as defined hereinbefore, mechanical connections between the rotors on the one hand and the stators on the other, so that the displacement angle between the teeth of the rotor and those of the stator of a random sensor is different from the corresponding angle of the other sensors and an electronic means for combining the signals from the electronic system of the different sensors.

According to a preferred embodiment of the angular position determination means according to the invention, the displacement angle between the teeth of the rotor and the stator of a random sensor can be deduced from the corresponding angle for any other sensor by the addition or subtraction of the quotient of $2\pi$ by the product of the number of teeth of the rotor and the number of sensors, or by a multiple of said quotient below the result of the division of $2\pi$ by the number of rotor teeth, said quotient or any multiple defined in this way also representing the displacement difference between the teeth of the stator and the rotor of two of the sensors used. However, an exception exists in the case of two sensors, whereof the displacement between the teeth of the stator and the rotor will preferably differ from the quotient of $\pi/2$ or $2\pi/3$ by the number of rotor teeth.

According to an advantageous embodiment of the invention, the ratio between the height of the teeth with a roughly rectangular section of the stators and rotors and the arc embraced by the end thereof is between 0.5 and 2 and the angle corresponding to the total arc embraced by the teeth of the stator and the rotor is between $\pi/3$ and $\pi$.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
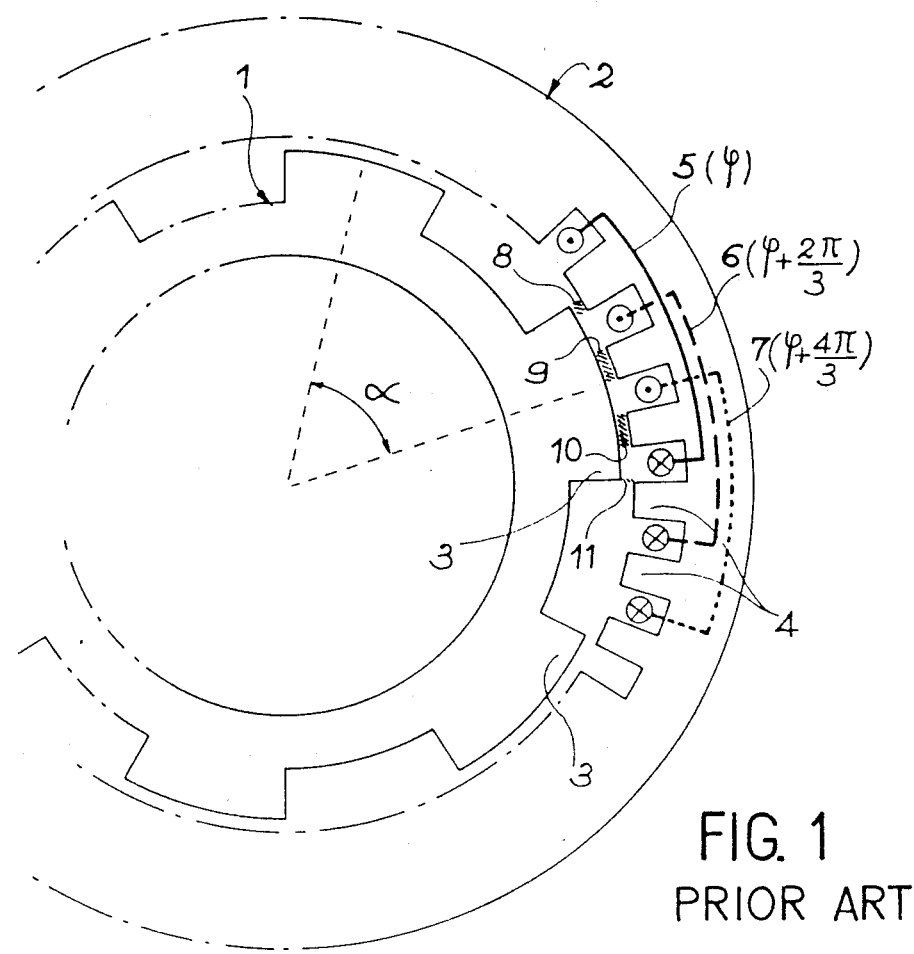
FIG. 1 an axial view of a prior art sensor or transducer.
Figure 9:
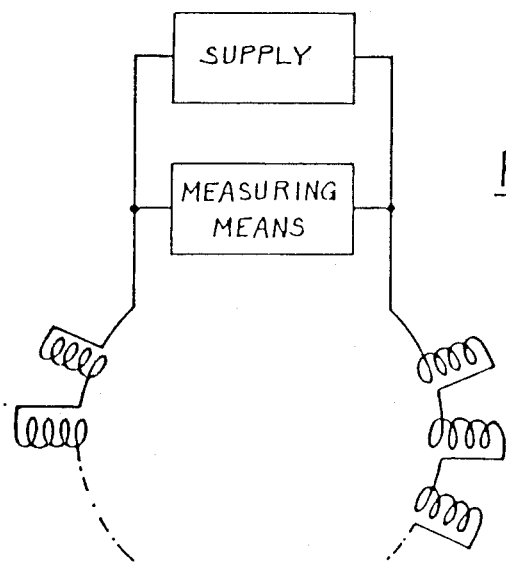
FIGS. 9–11 power supply means connected to coils and various types of measuring means.
Figure 11:
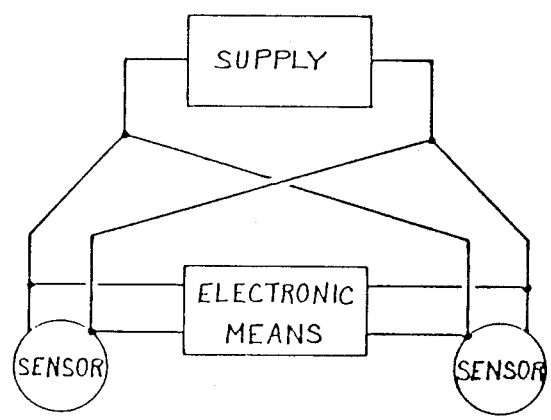
Figure 10:
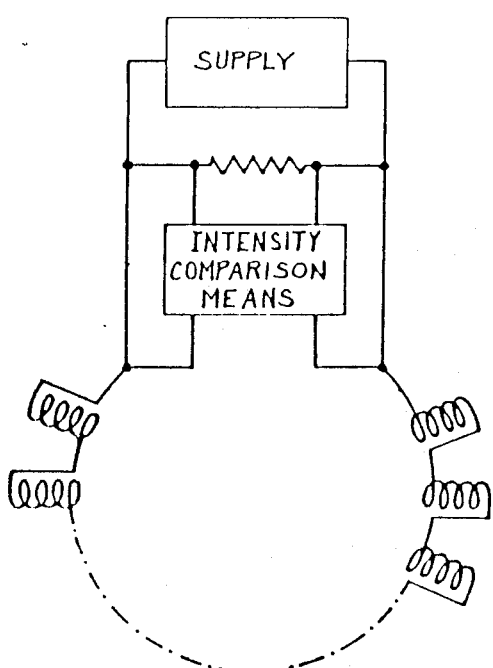

FIG. 1 shows a known apparatus comprising a rotor 1 having M teeth 3 and a stator 2 having $3 \times M$ teeth 4. The electric power supply is ensured by a three-phase system constituted by coils 5,6 and 7. FIGS. 9, 10 and 11 each show power supply means for the coils.

Each tooth 3 is consequently positioned facing three teeth 4. A rotation of rotor 1 by an angle $\alpha = 2\pi/M$ makes it possible to obtain an identical configuration of teeth relationships as shown in FIG. 1, which corresponds to an electric angle of $2\pi$. In the case of a smaller rotation of rotor 1, the relative position of rotor 1 and stator 2 is modified. The magnetic fluxes passing through the air gaps such as 8,9,10 and 11 are modified in intensity as a result of the permeance variation between the teeth of the stator 2 and the rotor 1. Thus, the voltage at the terminals of coils 5,6 and 7, assuming a constant intensity, varies continuously during a rotation of the rotor 1 with a period corresponding to the angle $\alpha$. The law governing this variation is very difficult to formulate due to the complexity of the phenomena and is largely dependent on the geometry of the teeth 3 and 4 (air gap, height, extent of the embraced arc, relative shapes of these teeth), as well as the position of coils 5–7. However, it is still possible to obtain substantially sinusoidal variations of said intensity as a function of the rotation angle, which is very advantageous for the exploitation of the measurements.

Figure 2:
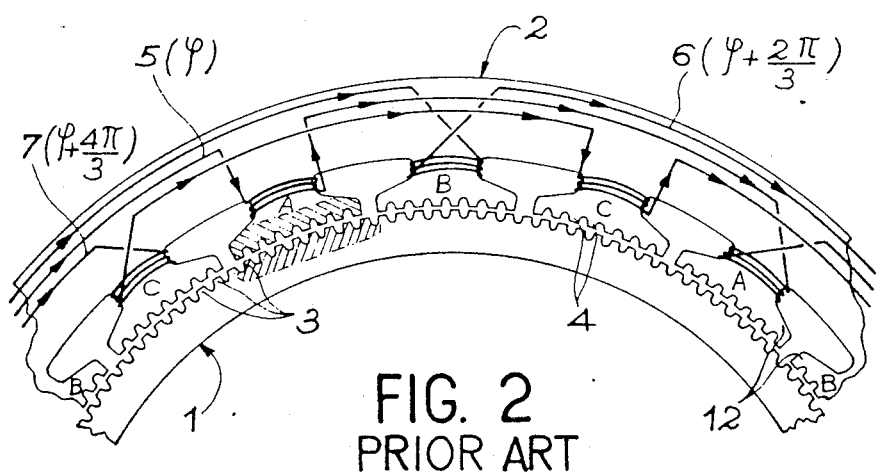
FIG. 2 an axial view of another prior art sensor.

FIG. 2 is another known example making it possible to obtain an electric angle of $2\pi$ corresponding to a fraction of the mechanical periodicity angle. Here, the teeth 4 of rotor 2 are carried by racks 12, which distribute them into groups supplied by threephase voltages. It is pointed out that in this position, teeth 4 of racks 12 designated by the letter B face teeth 3 of rotor 1, as opposed to the teeth of racks A and C. The angular displacement of teeth A with respect to teeth 3 is equal to $\frac{1}{3}$ of the angle separating two consecutive teeth 3, whilst that of the teeth C is equal to 2/3 of said angle, which is linked with the electric phase displacement of $2\pi/3$ between these three groups. Thus, it is necessary to displace them by the mechanical angle corresponding to said displacement, i.e. $2\pi/3M$, in which M is the number of teeth 3.

This FIG. 2, which shows a specific realisation of an angular sensor, gives an idea of the precision which can be expected, which requires a difficult and costly machining of the rotor 2. It is for this reason that the sensors used in the invention and shown in FIG. 3 do not adopt this arrangement and comprise a rotor 1 and a stator 2, once again equipped with teeth 3 and 4, but in this case the teeth of the stator and rotor are in equal numbers M and regularly distributed and there is only a single coil 20 arranged around all the teeth, namely in this case teeth 4 of stator 2. FIGS. 9, 10 and 11 each show power supply means for the coils. However, it would be possible to envisage a multi-part coil, provided that said parts all have windings around all the teeth. Thus, the electric current is single-phase. Rotor 1 is recessed and has a key slot 21 on its internal diameter, stator 2 has two key slots 22 and 23 on its external diameter. The keys used for this purpose carry the respective references 41 and 42 (FIG. 4). FIG. 9 shows a power supply for a coil and measuring means connected thereacross.

Before continuing with the description of the invention, reference is made to what was stated in general terms hereinbefore in connection with these sensors, namely that the rotor can be inside or outside the stator, or even alongside the same on the same shaft, the air gap then being planer, whilst the coil can be carried either by the stator or by the rotor. In general terms, the term stator and rotor are used to facilitate the present description and must be interpreted in such a way as not to restrict the scope of the invention.

During the rotation of rotor 1, the shape of air gap 24 is modified and, as for the previous examples, the permeance of the magnetic circuit constituted by stator 1 and rotor 2 varies, as well as the current flowing in coil 20. However, it is no longer possible to obtain a signal, whose voltage varies almost sinusoidally as a function of the electric angle, i.e. $v = v_1 \cos \theta \sin \Omega t$, in which $\Omega$ is the frequency of the alternating signal. With the sensor of FIG. 3, a result is obtained which, when broken down into Fourier series gives $v = (v_0 + v_1 \cos \theta + \ldots + v_i \cos \theta + \ldots) \sin \Omega t$. The ideal would be to be able to cancel out all the $v_i$ other than $v_1$. This is impossible with regards to $v_0$ but the influence of the terms $v_2$, $v_3$ etc. can be reduced due to an appropriate geometry of the teeth. Simulations on the computer which have been carried out made it possible to give the following rules valid for M teeth 3 with an approximately rectangular section regularly distributed on the rotor:

the ratio $(R3e - R3i)/\beta R3e$, in which $\beta$ is expressed in radians must be between 0.5 and 2, the angle $\beta \times M$ must be between $\pi/3$ and $\pi$ radians.

Respecting these proportions, which also apply to teeth 4 of stator 2, makes it possible to significantly reduce the coefficients $v_2$, $v_3$, etc. and as a result a voltage $v = (v_0 + v_1 \cos \theta) \sin \Omega t$ is obtained, if the current intensity is constant and whose exploitation is much simpler. Without passing beyond the scope of the invention, it is also possible to supply a constant voltage signal and it is then its intensity which varies in a quasi-sinusoidal manner as a function of $\theta$, to within a constant $(i = \{i_0 + i_1 \cos \theta + \ldots + i_n \cos n\, \theta\} \sin \Omega t)$: the electronic processing of said signal being the same.

Figure 3:
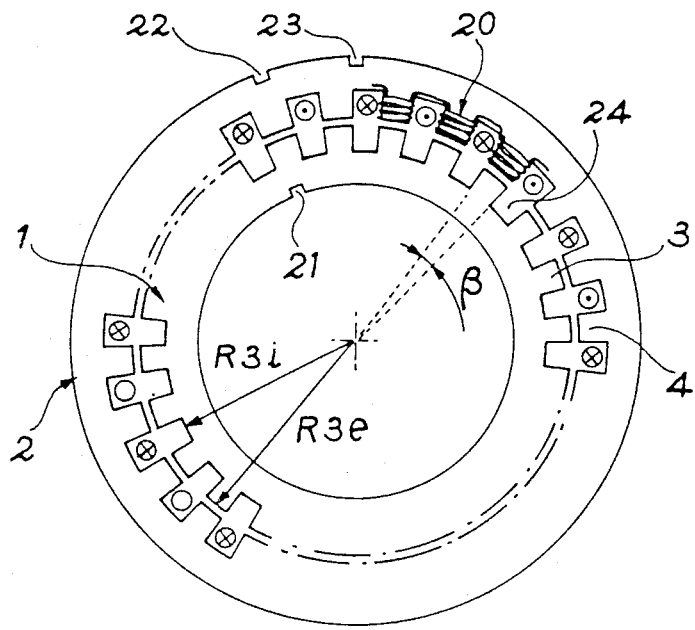
FIG. 3 an axial view of a sensor used in the invention.
Figure 4:
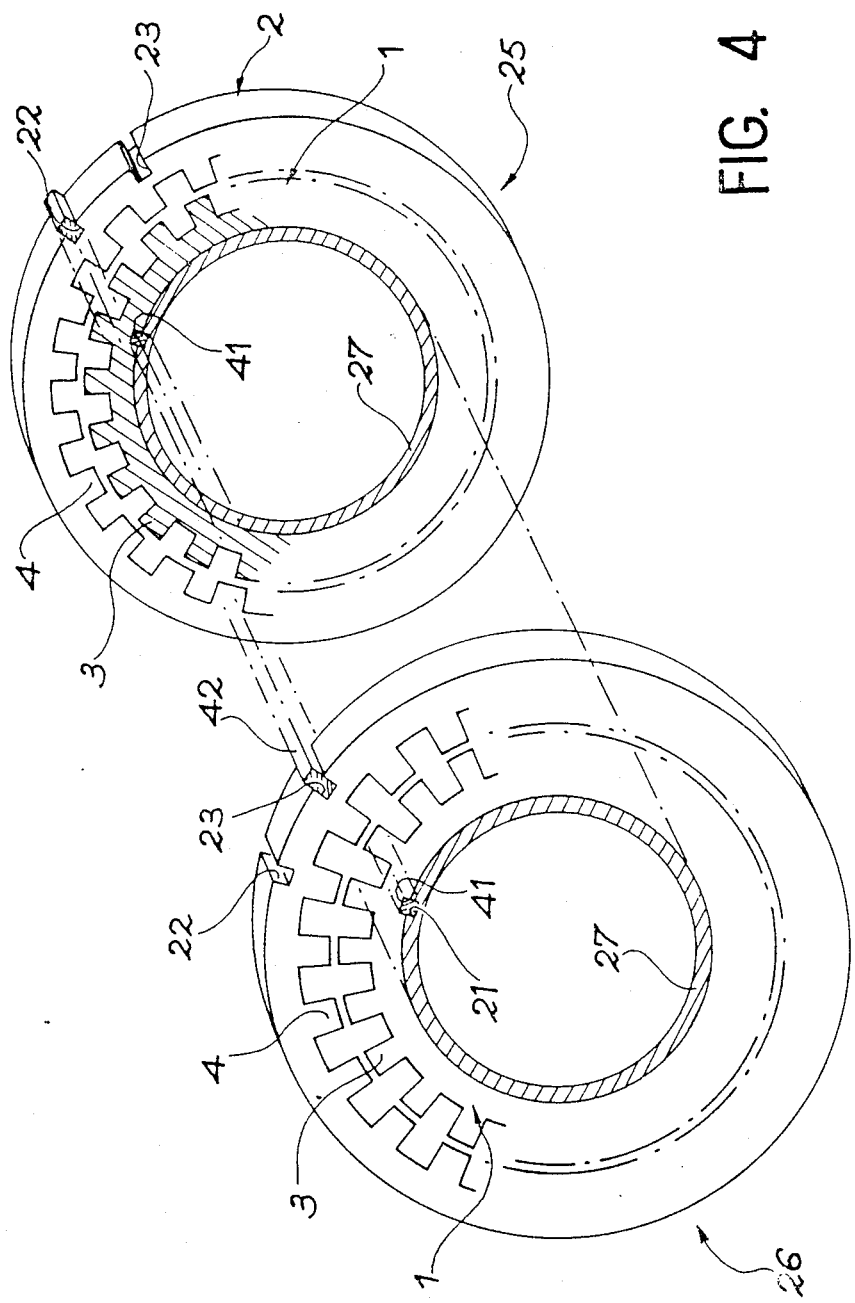
FIG. 4 a simplified perspective of a possible embodiment of the invention.
Figure 8:
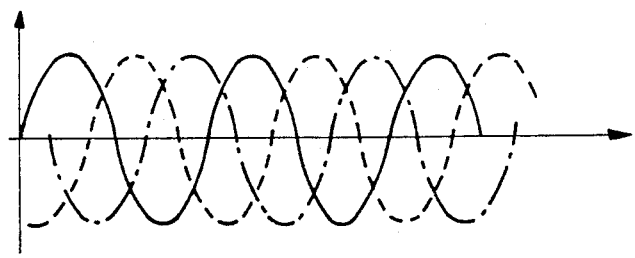

FIG. 4 shows two identical sensors or transducers 25,26 of the type described in FIG. 3. The two rotors are placed on an advantageously hollow shaft 27 so as to limit its weight and permit the passage of electric cables. Key slots 21 ensure the alignment of teeth 3 of the two rotors 1. However, an angular displacement of the stators is brought about by aligning the key slots 22 of one and 23 of the other on an envelope 40 shown in FIG. 5. The angle formed by slots 22,23 is not immaterial and is generally equal to the quotient of $2\pi$ by M and by the number of sensors used, or by a multiple of said value, so that the electric angles of the different stators are regularly distributed from 0 to $2\pi$ and are all different. In the case, not shown here, of three sensors with thirty teeth, the displacement would be $2\pi/3$ for the electric angle, $2\pi/90$ for the mechanical angle. With a view to mass production, the stator of each sensor could be provided with three key slots displaced by $2\pi/90$ and $2\pi/45$ (by $2\pi/30$ with respect to the first of them). The signals supplied by the three sensors as a function of the rotation of the rotors would be shown in FIG. 8, on assuming that their response is not only periodic, but also sinusoidal.

Figure 6:
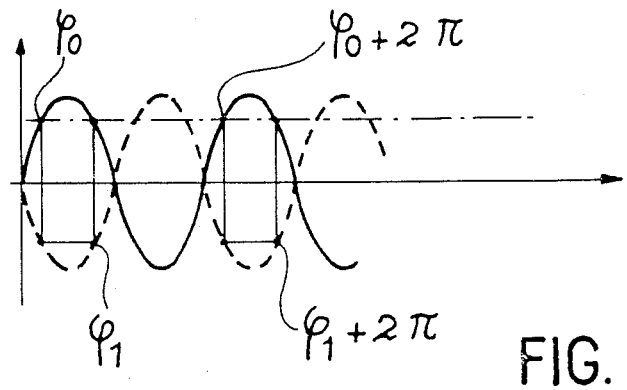
FIGS. 6–8 various types of signals obtainable by reluctance machines.
Figure 7:
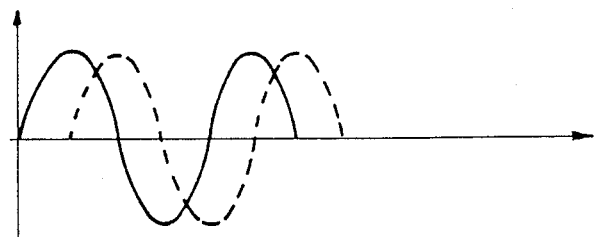

However, there is an exception when there are two sensors. The application of the above principle would lead to placing the two sensors at an electric angle equal to $2\pi/2$. FIG. 6 then shows that electric angle $\psi 0$ and $\psi 1$ not spaced by $2\pi$ supply the same signal on both sensors. Thus, the biunivocal correspondence between the signals and the electric angle is lost. This is why the stators must be displaced by a different electric angle. The value of $\pi/2$ is generally chosen, although $2\pi/3$ is also used. Signals of the type shown in FIG. 7 are then obtained.

Figure 5:
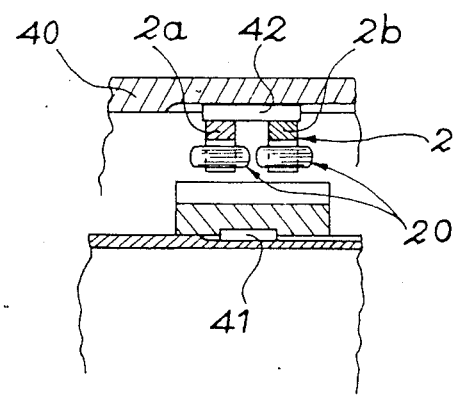
FIG. 5 a diametral section of another embodiment of the invention.
Figure 5:
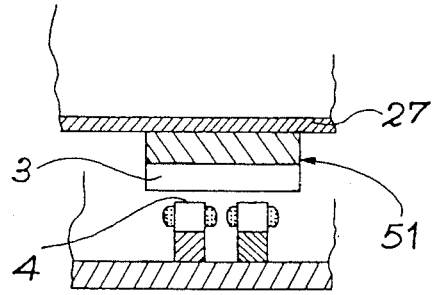

FIG. 5 shows a variant of this embodiment of the invention in a diametral sectional view. In general terms, the centering of rotor 1 on stator 2 must not necessarily be very accurate with this construction, due to the identity of the function of all the teeth. Defects of positioning, circularity and angular distribution of teeth 3 and 4 are much less prejudicial than with the devices shown in FIGS. 1 and 2. It is possible to accept that centering is effected by ball bearings, not shown in this case, positioned on shaft 27 and envelope 40. The angular position determination means is essentially limited to the sensors 25,26 shown in FIG. 4 and consequently has a light weight.

It is possible to significantly decrease the influence of the axial displacement between stators 2 and rotors 1 by increasing the length thereof. Certainty then exists of not erroneously decreasing the permeance of the magnetic circuit. As shown in FIG. 5, only a single rotor 51 may be used, which has an adequate length to face the two stators 2a and 2b, in place of two individual rotors 1. The fitting and manufacture of the sensors are consequently further simplified.

It is also possible to realise the angular position determination means in a slightly different manner, which is shown in FIG. 11, by adding for each sensor 25,26 another single-phase coil around the teeth 3 of rotors 1 or 51. One of the coils is then used for the electric power supply (necessarily that of rotor 51 in the constructions when there is a single rotor, as is the case in FIG. 5), the other coil of each sensor 25,26 continuing to be used for collecting the induced electric signal.

Finally, it is possible to use only a sensor 25, like that described relative to FIG. 3. The voltage at the terminals of coil 20 and the intensity of the signal passing through the same can be compared via a shunt circuit, e.g. constituted by a fixed resistor bringing about correspondence between an intensity and the voltage at the terminals of coil 20. FIG. 10 shows such intensity comparison means. The comparison therefore relates to the intensity of the signal passing through said coil 20 and the intensity of the signal passing through the shunt circuit.

The disadvantage of using a single sensor 25 is that it is only possible to carry out measurements on an electric angle equal to $\pi$, because uncertainty exists if it is wished to carry out measurements on wider ranges. Moreover, the accuracy obtained with a single sensor 25 is much lower.

In all these embodiments of the invention, the electronic exploitation of the signals obtained takes place by using known circuits, as indicated in the work "Synchro Conversion Handbook", ILC Data Device Corporation, 1982. Page 21, FIG. 2.1 of the "Synchro Conversion Handbook", shows that it is routine to deduce an angle $\theta$ from $\cos\theta$ and $\sin\theta$ by electronic circuitry and to effect comparison with a reference $\phi$. This embodiment can also be used with two sensors having an electric angular offset of $\pi/2$.

Thus, the angular position sensor 25 has numerous advantages. It has a very simple shape and does not require complicated manufacture. Moreover, the choice of a single-phase coil makes it possible to limit the consequences of poor coaxiality of the axes of parts 27,40 supporting rotor 1 and stator 2 or irregularities of machining of teeth 3 and 4. The thus produced errors are averaged out over the entire air gap 24 and are consequently largely cancelled out.

Supplementary advantages are provided by the use of an angular position means constituted by a plurality of such sensors 25. It is possible to obtain finer angular discretizations and also the use of a single projecting rotor 51 limits the consequences of a poor axial positioning of the carrier parts 27 and 40. The number of sensors 25 which can be arranged in parallel is not in theory limited, but as the regulation or setting by the keys 41,42 is very precise, this number is certainly high in practice. Thus, it is possible to obtain very accurate angular position measurements as a result of the present invention and which can therefore prove to be very useful in robotics.

What is claimed is:

1. An angular position sensor comprising:
    a pair of relatively rotatable ferromagnetic components movable to different angular positions relative to each other with respect to an axis, each component having the same number of regularly distributed teeth as the other component, the teeth in one component separated by an air gap from the teeth in the other component;
    a plurality of coils connected in series with each other between a pair of terminals and associated with the teeth in one of said components, said coils corresponding in number to the number of associated teeth and each coil being disposed around an associated tooth that adjacent teeth are of opposite magnetic polarity with respect to each other;
    means connected across said terminals for providing an electric excitation signal having a measurable constant electrical characteristic to said plurality of coils;
    said measurable constant electrical characteristic being modulatable in response to variations in the magnetic reluctance of said air gap effected by changes in the relative angular position between said components;
    and electronic means connected across said terminals for measuring the modulation of said constant electrical characteristic to determine the relative angular position of said components.

2. An angular position sensor according to claim 1, wherein the ration between the height of a tooth and the length of an arc embraced by the ends of a tooth is between 0.5 and 2 and wherein the angle corresponding to the total arc embraced by the teeth of the components is between $\pi/3$ and $\pi$.

3. Angular position determination means comprising:
a plurality of angular position sensors, each sensor comprising:
a pair of relatively rotatable first and second ferromagnetic components movable to different angular positions relative to each other with respect to an axis, each component having the same number of regularly distributed teeth as the other component, the teeth in one component separated by an air gap from the teeth in the other component;
a plurality of coils connected in series with each other between a pair of terminals and associated with the teeth in one of said components, said coils corresponding in number to the number of associated teeth and each coil being disposed around an associated tooth such that adjacent teeth are of opposite magnetic polarity with respect to each other;
means connected across said terminals for providing an electric excitation signal having a measurable constant electrical characteristic to said plurality of coils;
said measurable constant electrical characteristic being modulatable in response to variations in the magnetic reluctance of said air gap effected by changes in the relative angular position between said components;
and electronic means connected across said terminals for measuring the modulations of said constant electrical characteristic by receiving and combining the output signals from said pluralities of coils to determine the relative angular positions of said components and for providing output signals corresponding thereto;
first mechanical connection means between said first components of said plurality of sensors;
and second mechanical connection means between said second components of said plurality of sensors.

4. An angular position determination means according to claim 3, wherein the first and second mechanical connection means are arranged in such a way that the displacement angle between the teeth of the first component and those of the second component of one sensor differs from the displacement angles of the other sensors.

5. An angular determination means according to claim 4, which comprises at least three sensors and wherein the displacement angle of said one sensor can be deduced from the corresponding displacement angle in any other sensor by the addition or substraction of the quotient of $2\pi$ by the product of the number of teeth of a component of said one sensor and the number of sensors, or by a multiple of said quotient below the result of the division of $2\pi$ by the number of teeth of said component of said one sensor, said quotient or said multiple defined in this way also representing the displacement angle difference between the teeth of the components of two of the other sensors used.

6. An angular determination means according to claim 4, which comprises two sensors and wherein the displacement angle difference between the teeth of the components of the two sensors is equal to the quotient of $\pi/2$ or $2\pi/3$ divided by the number of teeth.

7. An angular position determination means according to claim 4, wherein one of said first and second mechanical means comprises the teeth of one component which constitute extensions of those of the other corresponding components.

8. An angular position determination means according to claim 4, wherein one of said components in each sensor is part of a single rotor long enough for the teeth thereof to face the teeth of the other components in all the sensors.

9. Angular position sensor means comprising:
ferromagnetic stator means;
ferromagnetic rotor means rotatable on an axis relative to said stator means;
each of said stator means and said rotor means having the same number of teeth means regularly distributed around said axis;
the teeth means on said stator means being spaced from the teeth means on said rotor means by an air gap;
a plurality of coils in series with each other between a pair of terminals and associated with the teeth means in one of said stator means and said rotor means, said coils corresponding in number to the number of teeth in said associated teeth means and each coil being disposed around an associated tooth such that adjacent teeth are of opposite magnetic polarity with respect to each other;
means connected across said terminals for providing an electric excitation signal having a measurable constant electrical characteristic to said plurality of coils;
said measurable constant electrical characteristic being modulatable in response to variations in the magnetic reluctance of said air gap effected by changes in the angular position of said rotor means relative to said stator means;
and electronic means connected across said terminals for measuring the modulation of said constant electrical characteristic to determine the relative angular position of said rotor means and said stator means.

10. Angular position sensor means according to claim 9 wherein said rotor means comprises one rotor and said stator means comprises one stator.

11. Angular position sensor means according to claim 9 wherein said rotor means comprises one rotor and said stator means comprises a plurality of mechanically interconnected stators, said stators being angularly offset relative to one another.

12. Angular position sensor means according to claim 9 wherein said rotor means comprises a plurality of mechanically interconnected rotors, said rotors being angularly offset relative to one another, and a plurality of mechanically interconnected stators, said stators being angularly offset relative to one another.

* * * * *